(12) United States Patent
Choi et al.

(10) Patent No.: US 11,167,629 B2
(45) Date of Patent: Nov. 9, 2021

(54) GLASS RUN OF DOOR HAVING IMPROVED AIR-TIGHTLY SEALING PERFORMANCE

(71) Applicants: Hyundai Motor Company, Seoul (KR); Kia Motors Corporation, Seoul (KR); HS R & A Co., Ltd., Gyeongsangnam-do (KR)

(72) Inventors: Hyung-Sik Choi, Seoul (KR); Jae-Hong Kim, Seoul (KR); Gyung-Jae Heo, Hwaseong-Si (KR); Jin-Hyung Bae, Yangsan-Si (KR)

(73) Assignees: Hyundai Motor Company, Seoul (KR); Kia Motors Corporation, Seoul (KR); HSR & ACo., Ltd., Yangsan-si (KR)

( * ) Notice: Subject to any disclaimer, the term of this patent is extended or adjusted under 35 U.S.C. 154(b) by 118 days.

(21) Appl. No.: 16/702,363

(22) Filed: Dec. 3, 2019

(65) Prior Publication Data

US 2020/0338973 A1  Oct. 29, 2020

(30) Foreign Application Priority Data

Apr. 25, 2019 (KR) .................. 10-2019-0048592

(51) Int. Cl.
| | |
|---|---|
| *B60J 10/76* | (2016.01) |
| *B60J 10/277* | (2016.01) |
| *B60J 10/24* | (2016.01) |
| *E06B 7/23* | (2006.01) |

(52) U.S. Cl.
CPC ............. *B60J 10/76* (2016.02); *B60J 10/24* (2016.02); *B60J 10/277* (2016.02); *E06B 7/2303* (2013.01)

(58) Field of Classification Search
CPC ........ B60J 10/76; B60J 10/277; B60J 10/246; B60J 10/79; E06B 7/2303
See application file for complete search history.

(56) References Cited

U.S. PATENT DOCUMENTS

| | | | | |
|---|---|---|---|---|
| 3,748,215 | A * | 7/1973 | Lenzi .................... | B60J 10/246 428/36.9 |
| 5,331,767 | A * | 7/1994 | Takeuchi .............. | B60J 10/777 49/475.1 |
| 6,623,014 | B1 * | 9/2003 | Martin .................... | B60J 10/24 277/630 |

(Continued)

FOREIGN PATENT DOCUMENTS

| | | | | |
|---|---|---|---|---|
| DE | 202012102647 U1 * | 10/2013 | ............. | B60J 10/84 |
| FR | 2745622 A1 * | 9/1997 | ............. | B60J 10/80 |

(Continued)

*Primary Examiner* — Marcus Menezes
(74) *Attorney, Agent, or Firm* — Morgan, Lewis & Bockius LLP

(57) ABSTRACT

A glass run of a door having improved the air-tightly sealing performance, in the glass run of the door mounted on a door frame to support the circumference of the door glass in the door of a vehicle, wherein the glass may include an internal glass run to be mounted on the door frame to be in contact with the internal surface of the door glass; and an external glass run to be mounted on a portion of the door frame where a garnish is attached, and to support an end portion of the door glass, and wherein the external glass run includes a support member for keeping a state in which the internal glass run has been initially mounted on the door.

18 Claims, 9 Drawing Sheets

(56) References Cited

U.S. PATENT DOCUMENTS

| | | | | |
|---|---|---|---|---|
| 8,069,615 B2* | 12/2011 | Heiman | ............... | B60J 10/80 |
| | | | | 49/498.1 |
| 2003/0178874 A1* | 9/2003 | Yamashita | ............ | B60J 10/50 |
| | | | | 296/216.09 |
| 2005/0178069 A1* | 8/2005 | Iwasa | ............... | B60J 10/246 |
| | | | | 49/498.1 |
| 2019/0275871 A1* | 9/2019 | Schaufler | ............. | B60J 10/25 |
| 2019/0389292 A1* | 12/2019 | Sakai | ............... | B60J 10/246 |
| 2020/0114737 A1* | 4/2020 | Choi | ............... | B60J 5/0402 |
| 2020/0130488 A1* | 4/2020 | Choi | ............... | B60J 10/76 |

FOREIGN PATENT DOCUMENTS

| | | | | |
|---|---|---|---|---|
| FR | 2762264 A1 | * | 10/1998 | ............ B60J 10/00 |
| JP | 59077938 A | * | 5/1984 | ............ B60J 10/248 |
| KR | 10-2009-0117252 A | | 11/2009 | |

\* cited by examiner

GLASS RUN OF DOOR HAVING IMPROVED AIR-TIGHTLY SEALING PERFORMANCE

CROSS-REFERENCE TO RELATED APPLICATION

The present application claims priority to Korean Patent Application No. 10-2019-0048592, filed on Apr. 25, 2019, the entire contents of which is incorporated herein for all purposes by this reference.

BACKGROUND OF THE PRESENT INVENTION

Field of the Invention

The present invention relates to a glass run of a door for supporting a door glass mounted in a vehicle door and mounted on the door, and more particularly, to a glass run of the door having improved the air-tightly sealing performance, which prevents water from being permeated into the indoor from the outside thereof even if pressure is high or there are a lot of flow rates from the outside.

Description of Related Art

A door 110 of a vehicle 100 is provided with a glass for the lighting and ventilation of the vehicle.

In the vehicle, as shown in FIG. 1 and FIG. 2, there is an example in which a door glass 120 is mounted between the door glass 120 and a garnish 151 without a step. In the line A-A in FIG. 1, the door glass 120 and the garnish 151 are mounted on the same surface without a step.

The door glass 120 can have a cross-sectional structure as shown in FIG. 2 or FIG. 3. A space where glass runs 130, 140 are installed is formed inside a door frame 111. The glass runs 130, 140 include the internal glass run 130 for supporting the internal surface of the door glass 120 and the external glass run 140 for supporting an end portion of the door glass 120, and is fastened to the space formed inside the door frame 111. As shown in FIG. 2, the end portion of the door glass 120 is attached with a slider 121 fixed to the internal surface of the door glass 120, and for elevating in the height direction of the vehicle inside the glass runs 130, 140 and the door frame 111. The glass runs 130, 140 are supported in close contact with the door glass 120 and the slider 121, and a contactor 122 contacts one side of the door frame 111 at the end portion of the slider 121, reducing the friction when the slider 121 is elevated. The garnish 151 for finishing the outside surface of the door frame 111 is fastened to the outside of the door frame 111. The internal side of the door frame 111 is finished by a door trim 152. In the interior of the vehicle, the door trim 152 finishes the glass runs 130, 140, a door internal plate 112, etc.

In mounting the door glass 120 at the door frame 111, the slider 121 is attached to the internal surface of the door glass 120, and the end portion of the slider 121 slides in the door frame 111 so that the door glass 120 and the garnish 151 are mounted at the same height, that is, on the same surface without a step.

Since there is no step between the door glass 120 and the garnish 151, it is possible to improve the appearance of the vehicle, and not to generate noise due to the step during traveling.

However, there is a problem in that in such a door, when the water from the outside thereof is supplied between the end portion of the door glass 120 and the external glass run 140, the water is permeated into the door glass 120. For example, there is a problem in that when the water of high pressure and high flow rate is supplied between the end portion of the door glass 120 and the external glass run 140 as in the high pressure washing, the water is permeated into the door glass 120. When the water of high pressure and high flow rate is supplied between the door glass 120 and the external glass run 140 and water leaks to the indoor side of the vehicle, the internal material is contaminated, causing degradation of quality, customer complaints, etc.

Furthermore, after the internal glass run 130 has been assembled, the shape thereof is permanently deformed from the initial assembled shape when an external force acts, degrading the sealing performance, and this causes water to be permeated into the door glass as described above.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a glass run of a door having improved the air-tightly sealing performance, which can keep the state that has been in close contact with a door glass even if water is permeated by high pressure or high flow rate from the outside, preventing moisture from being permeated into the indoor.

In a glass run of a door having improved the air-tightly sealing performance according to an exemplary embodiment of the present invention for achieving the object, as the glass run of the door mounted on a door frame to support the circumference of the door glass in the door of a vehicle, the glass run includes an internal glass run to be mounted on the door frame to be in close contact with the internal surface of the door glass; and an external glass run to be mounted on a portion of the door frame where a garnish is attached, and to support an end portion of the door glass, and the external glass run includes a support member for keeping a state in which the internal glass run has been initially mounted on the door.

The internal glass run includes a pillar portion to be attached to the door frame, and an air-tightly sealing portion connected to the pillar portion and in close contact with the internal surface of the door glass, and the support member is formed on at least any one of the pillar portion and the air-tightly sealing portion.

The support member includes a locking protrusion formed on the pillar portion to support the air-tightly sealing portion, or a fastening protrusion formed on the air-tightly sealing portion to support the pillar portion.

The pillar portion includes a locking protrusion to be protruded toward the air-tightly sealing portion from the pillar portion, the air-tightly sealing portion includes a fastening protrusion to be protruded toward the pillar portion from the air-tightly sealing portion, and the locking protrusion and the fastening protrusion are coupled to each other, when the door glass is closed.

The locking protrusion and the fastening protrusion are formed to be inclined in a direction opposite to each other.

The locking protrusion is formed to be inclined from an imaginary horizontal axis toward the front side of the vehicle, and the fastening protrusion is formed to be inclined from the imaginary horizontal axis toward the rear side of the vehicle.

The locking protrusion is formed to be inclined from an imaginary horizontal axis toward the rear side of the vehicle, and the fastening protrusion is formed to be inclined from the imaginary horizontal axis toward the front side of the vehicle.

The locking protrusion is formed in plural along the front and rear direction of the vehicle.

A distal end portion of the air-tightly sealing portion is formed longer than a distal end portion of the pillar portion in the front and rear direction of the vehicle.

The pillar portion and the air-tightly sealing portion are connected to each other by a connecting portion, and the connecting portion has a bending groove formed at a predetermined depth from an internal surface of the connecting portion.

According to the glass run of the door having improved the air-tightly sealing performance of the present invention having the above configuration, since the glass run keeps the shape and keeps the closely contacted state even if the water of high pressure or high flow rate is permeated, water is not permeated into the interior of the vehicle.

Furthermore, since the glass run is mounted on the door and then supports the inside surfaces of the pillar portion and the air-tightly sealing portion each other, the initial mounted state may be kept as it is even if the permeation proceeds.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
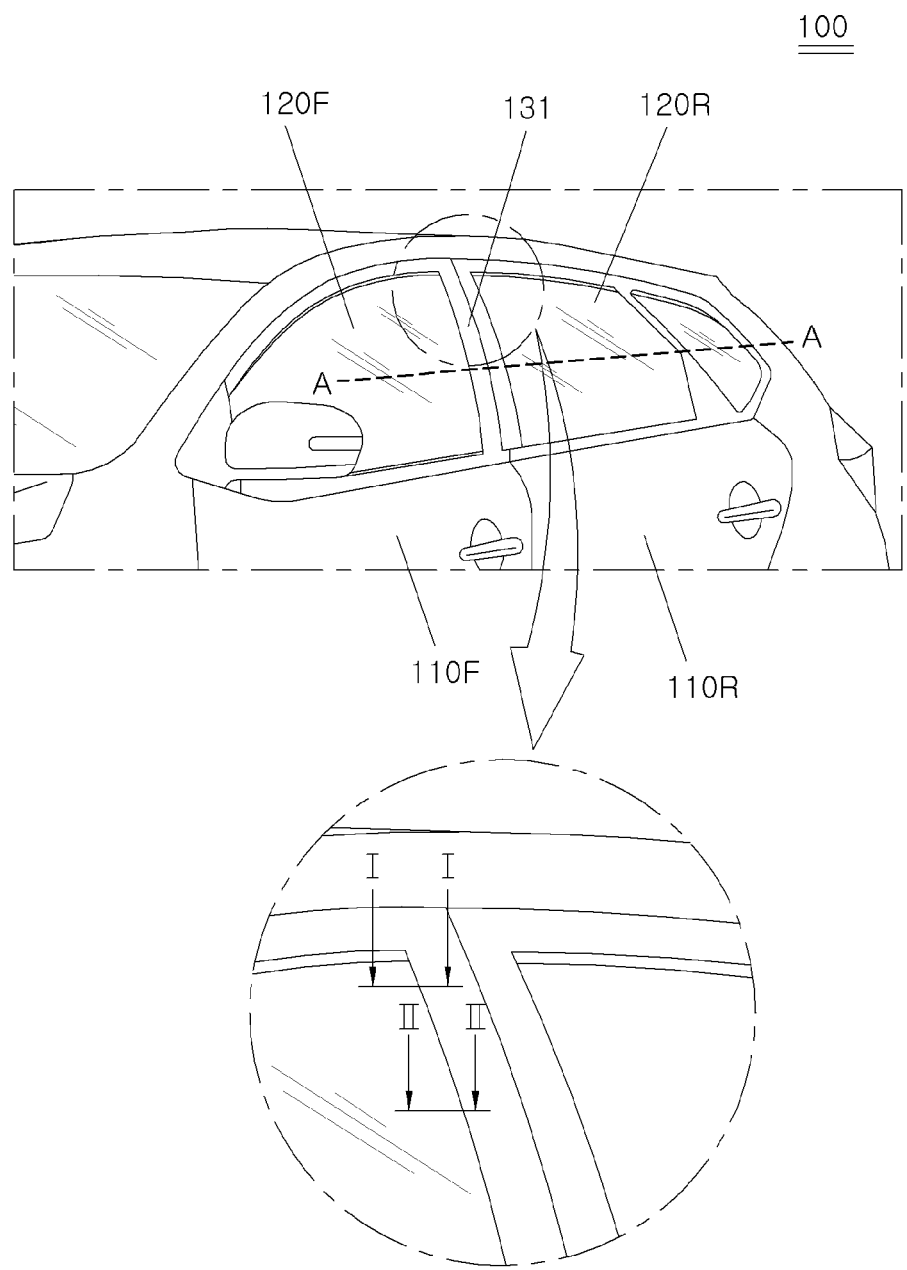
FIG. 1 is a side perspective diagram showing a vehicle to which a glass run according to the related art has been applied.
Figure 2:
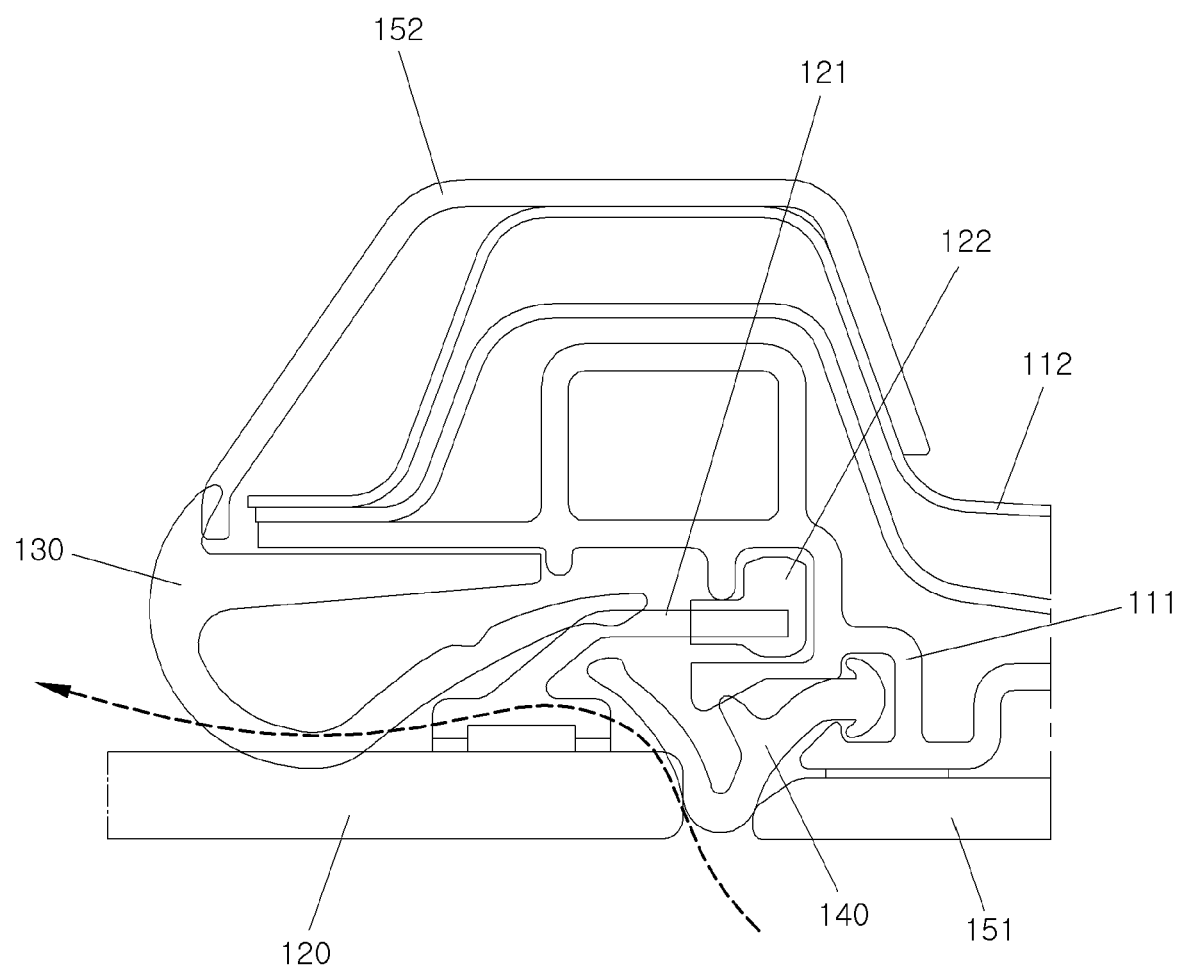
FIG. 2 is a cross-sectional diagram according to the line I-I in FIG. 1.
Figure 3:
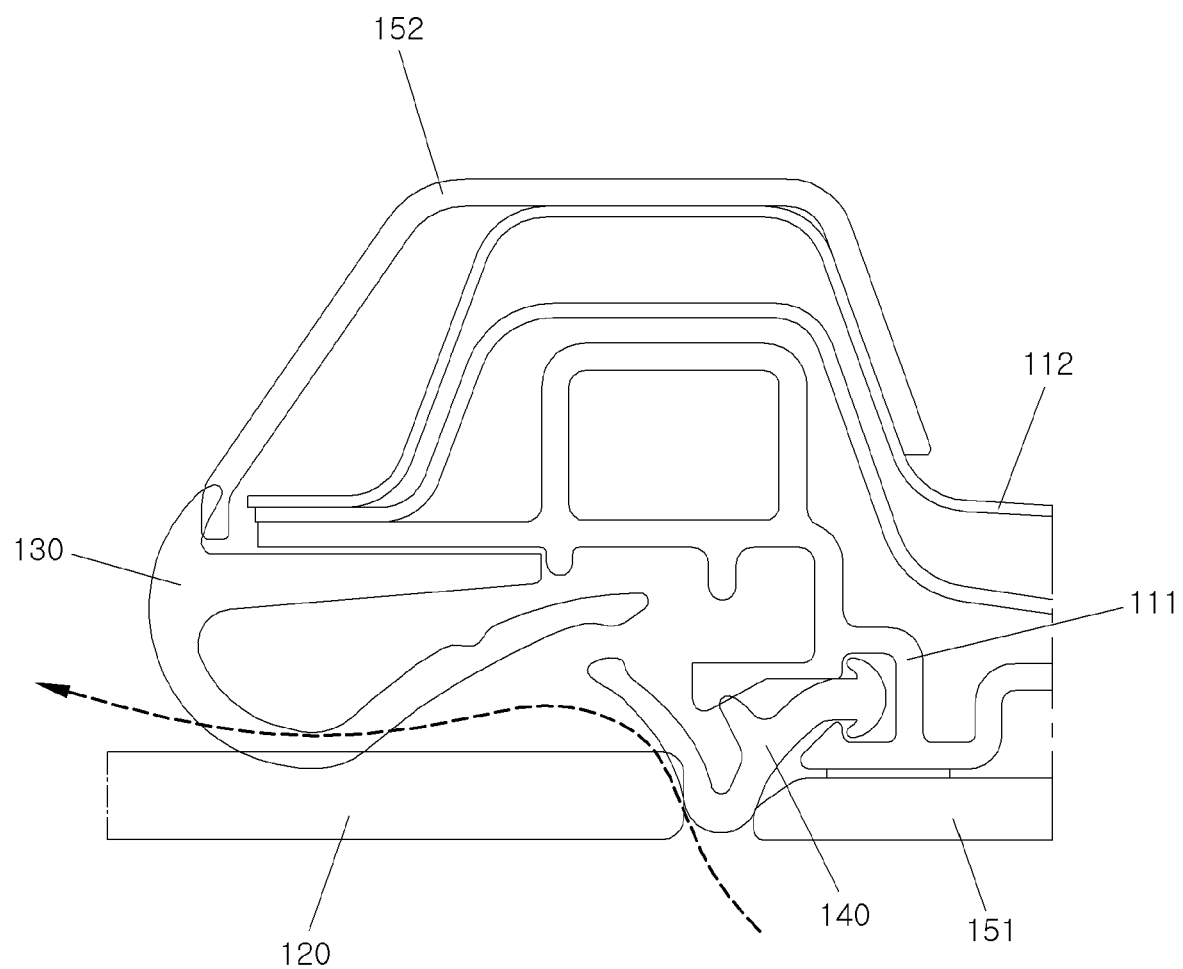
FIG. 3 is a cross-sectional diagram according to the line II-II in FIG. 2.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other h, and the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a glass run of a door having improved the air-tightly sealing performance according to an exemplary embodiment of the present invention will be described in detail with reference to the accompanying drawings.

Figure 4:
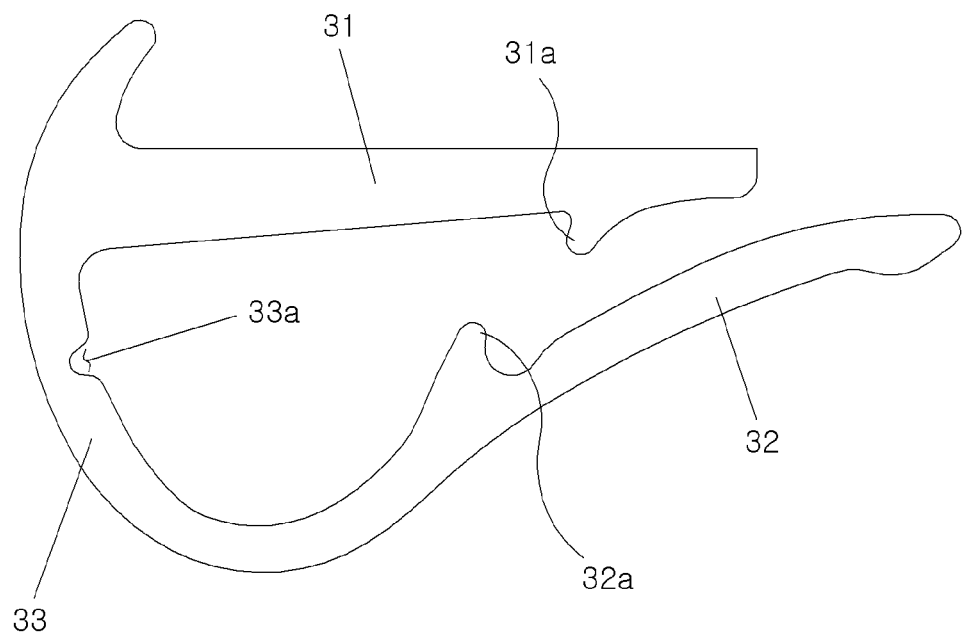
FIG. 4 is a cross-sectional diagram showing a state before an internal glass run in the glass run of a door having improved the air-tightly sealing performance according to an exemplary embodiment of the present invention is mounted.
Figure 5:
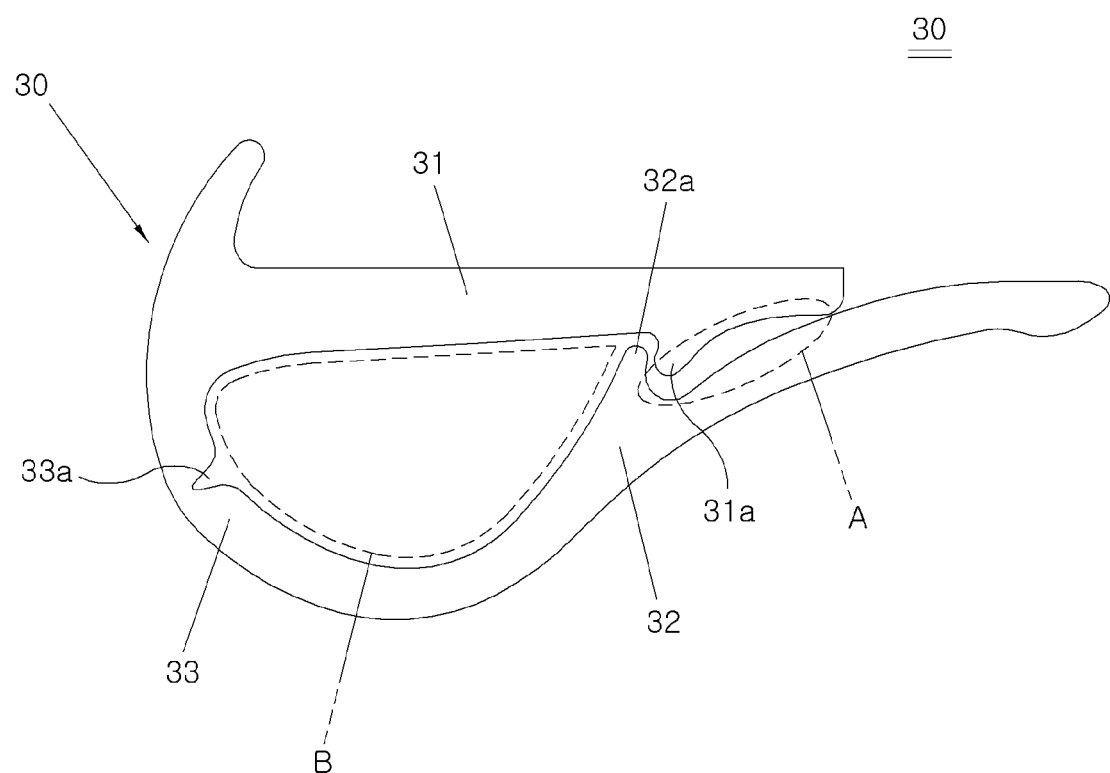
FIG. 5 is a cross-sectional diagram showing a state after the internal glass run in the glass run of the door having improved the air-tightly sealing performance according to an exemplary embodiment of the present invention has been mounted.

FIG. 4 and FIG. 5 show an internal glass run 30 in the glass run of the door having improved the air-tightly sealing performance according to an exemplary embodiment of the present invention. FIG. 4 shows a cross section before the internal glass run 30 is mounted, and FIG. 5 shows a cross section in a state where the internal glass run 30 mounted on a door frame 11 and in close contact with the internal surface of a door glass 20, and an external glass run 40 mounted on a portion of the door frame 11 where a garnish is attached and for supporting the end portion of the internal glass run 30, and the shape of the internal glass run 30 is deformed, preventing the water of high pressure and high capacity from being permeated therein.

The shape of the internal glass run 30 will be described in more detail as follows.

The internal glass run 30 includes a pillar portion 31 attached to the door frame 11 side of the door, an air-tightly sealing portion 32 formed to extend from the pillar portion 31 to be in contact with the internal surface of the door glass 20, and a connecting portion 33 for connecting the air-tightly sealing portion 32 with the pillar portion 31. The internal glass run 30 is integrally made of a material such as synthetic rubber.

The cross section of the pillar portion 31 is formed in the longitudinal direction of the vehicle. The pillar portion 31 is attached to the door frame 11 by use of an adhesive agent, a hook structure, etc.

The air-tightly sealing portion 32 is formed to be inclined in the longitudinal direction of the vehicle. The air-tightly sealing portion 32 is formed to be inclined to be closer to the pillar portion 31 toward the end portion of the door glass 20. That is, FIG. 4 shows the internal glass run 30 mounted at the rear end portion of the front door, and the air-tightly sealing portion 32 is formed to be inclined so that the right end portion adjacent to the end portion of the door glass 20 (refer to FIG. 4) is closer to the pillar portion 31. The air-tightly sealing portion 32 is in close contact with the internal surface of the door glass 20 when the internal glass run 30 has been mounted on the door to be air-tightly sealed. At the instant time, a distal end portion of the air-tightly sealing portion 32 is formed longer than a distal end portion of the pillar portion 31 in the front and rear direction of the vehicle.

The pillar portion 31 and the air-tightly sealing portion 32 has been spaced from each other before the pillar portion 31 and the air-tightly sealing portion 32 are mounted on the door, but the internal glass run 30 is mounted on the door and then deformed to fit the space formed between the door frame 11 and the door glass 20.

When the internal glass run 30 has been mounted on the door, the pillar portion 31 and the air-tightly sealing portion 32 are formed with a support member so that the pillar portion 31 and the air-tightly sealing portion 32 do not move relative to each other. The support member prevents the air-tightly sealing portion 32 from being pushed against the pillar portion 31. That is, even if the washing water of high pressure acts on the air-tightly sealing portion 32, the air-tightly sealing portion 32 is not pushed by the support member, preventing the air-tightly sealing between the air-tightly sealing portion 32 and the door glass 20 from becoming weak.

As a specific example of the support member, there may be a locking protrusion 31a formed on the pillar portion 31 to support the air-tightly sealing portion 32, or a fastening protrusion 32a formed on the air-tightly sealing portion 32 to support the pillar portion 31.

That is, the locking protrusion 31a protruded to be inclined from the pillar portion 31 is formed on the pillar portion 31, and the fastening protrusion 32a protruded to be inclined from the air-tightly sealing portion 32 is formed on the air-tightly sealing portion 32. When the door glass 20 is closed, the door glass 20 pushes the fastening protrusion 32a to the locking protrusion 31a so that the locking protrusion 31a and the fastening protrusion 32a are fastened to each other. The locking protrusion 31a and the fastening protrusion 32a are formed on the pillar portion 31 and the air-tightly sealing portion 32, respectively, and when the internal glass run 30 is mounted, the locking protrusion 31a and the fastening protrusion 32a are fastened, preventing the air-tightly sealing portion 32 from being pushed by the washing water of high pressure. That is, the locking protrusion 31a and the fastening protrusion 32a prevent the air-tightly sealing portion 32 from being pushed at a portion indicated by an in FIG. 4.

As described above, the air-tightly sealing portion 32 is prevented from being pushed even if the washing water of high pressure acts, preventing the air-tightly sealing portion 32 from being spaced from the door glass 20, and preventing the washing water of high pressure from being permeated between the air-tightly sealing portion 32 and the door glass 20 when the washing water of high pressure acts.

Furthermore, when the door glass 20 is closed, the support member, that is, the locking protrusion 31a, is formed to be locked by the fastening protrusion 32a, and as indicated by B in FIG. 5, the cross-sectional shape of the internal glass run 30 may be changed from the shape having one side open to a state such as a closed curve to keep the state where the internal glass run 30 has been mounted as it is, being advantageous for permanent deformation.

The connecting portion 33 connects the pillar portion 31 to the air-tightly sealing portion 32. Therefore, the internal glass run 30 has a portion, in which the connecting portion 33 has been formed, closed, and has the opposite side thereof formed in an open form.

A bending groove 33a is formed on the internal surface of the connecting portion 33 so that the connecting portion 33 is easily deformed when the internal glass run 30 has been mounted on the door. Since the portion of the connecting portion 33 where the bending groove 33a has been formed is thinner than the other portions thereof, the connecting portion 33 is cupped around the bending groove 33a. That is, when the internal glass run 30 is mounted, the internal glass run 30 is deformed around the bending groove 33a so that the internal glass run 30 is deformed to have a constant form and mounted.

Figure 6:
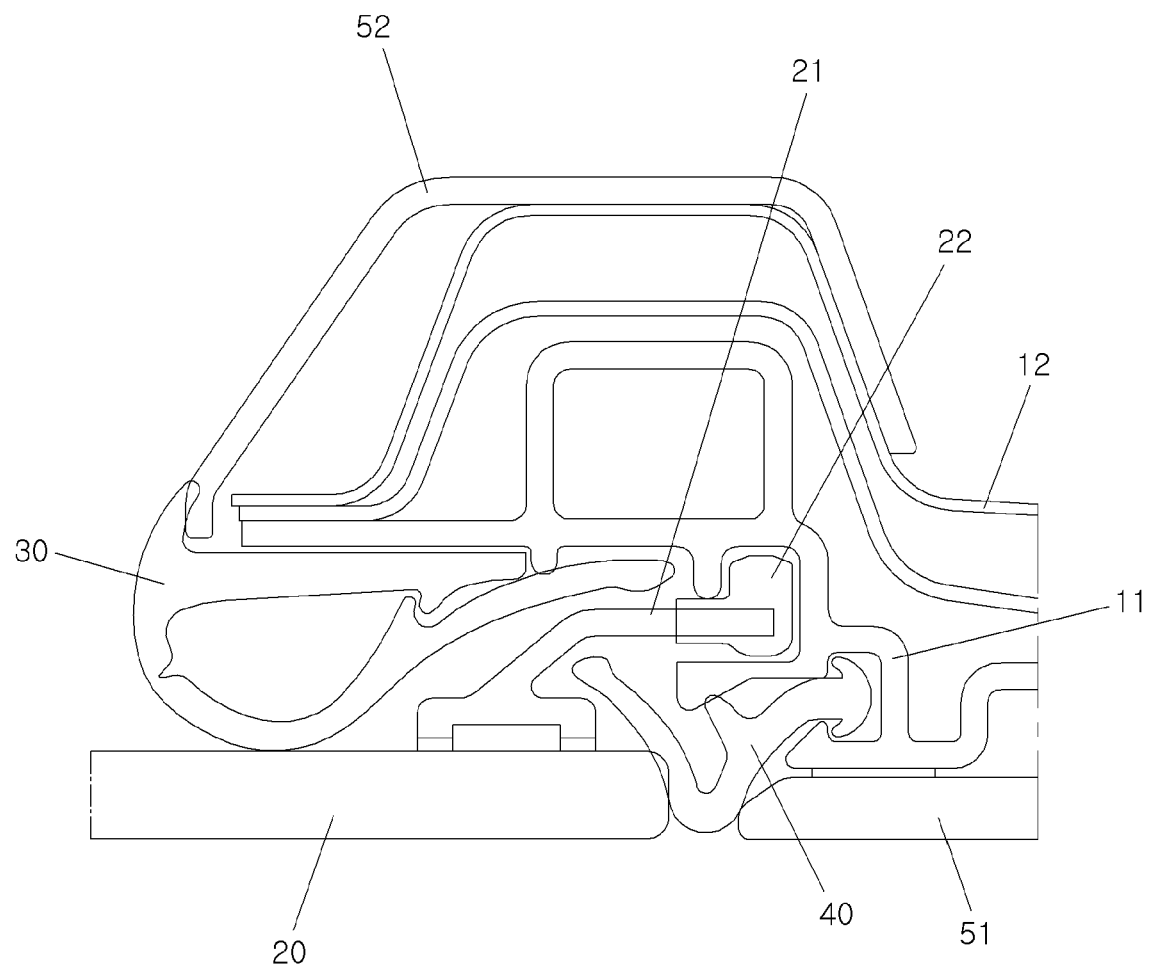
FIG. 6 is a cross-sectional diagram showing the cross section of the door on which the glass run of the door having improved the air-tightly sealing performance according to an exemplary embodiment of the present invention has been mounted (a portion where a slider has been mounted).
Figure 7:
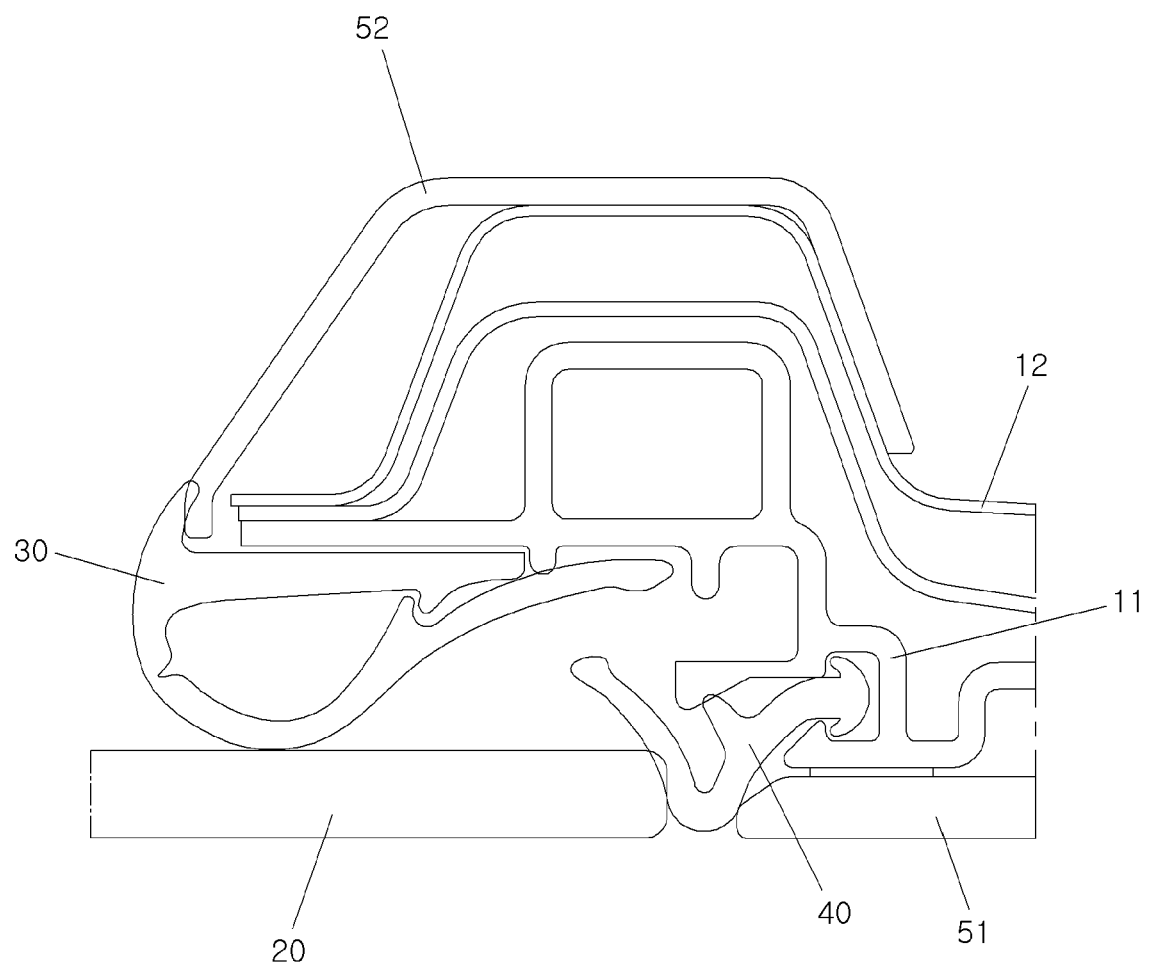
FIG. 7 is a cross-sectional diagram showing the cross section of the door on which the glass run of the door having improved the air-tightly sealing performance according to an exemplary embodiment of the present invention has been mounted (a portion where a slider has not been mounted).

FIG. 6 and FIG. 7 show a state where the above-described glass run has been mounted on the door. FIG. 6 is a cross-sectional diagram of a portion where the slider 21 and a contactor 22 have been mounted for easing the elevation of the door glass 20 when the door glass 20 is elevated, and FIG. 7 shows a portion where the slider 21 and the contactor 22 has not been mounted.

The internal glass run 30 is attached to the door frame 11 to support the internal surface of the door glass 20, and the external glass run 40 is mounted to a portion of the door frame 11 where the garnish 51 is attached to support the end portion of the door glass 20.

Even if the water of high pressure and high flow rate acts between the door glass 20 and the external glass run 40 by the washing water of high pressure, etc., the external glass run 40 is primarily blocked. However, since the external glass run 40 is easily deformed, the water is permeated into the door glass 20 and the external glass run 40. The thus permeated water tries to permeate between the internal glass run 30 and the door glass 20, but since the internal glass run 30 is not deformed by the support member and keeps its shape, the water does not permeate between the internal glass run 30 and the door glass 20. As shown in FIG. 5, the internal glass run 30 has the support member, that is, the locking protrusion 31a and the fastening protrusion 32a fastened to each other to prevent the air-tightly sealing portion 32 from being pushed against the pillar portion 31 (the portion A in FIG. 5) and to keep the form in which the pillar portion 31, the connecting portion 33, and the air-tightly sealing portion 32 in the internal glass run 30 are connected in the closed curve (the portion B in FIG. 5), securely keeping the air-tightly sealing structure. Therefore, the water is not permeated between the internal glass run 30 and the door glass 20.

Reference numerals not described 12, 52 denote a door internal plate and a door trim, respectively.

Figure 8:
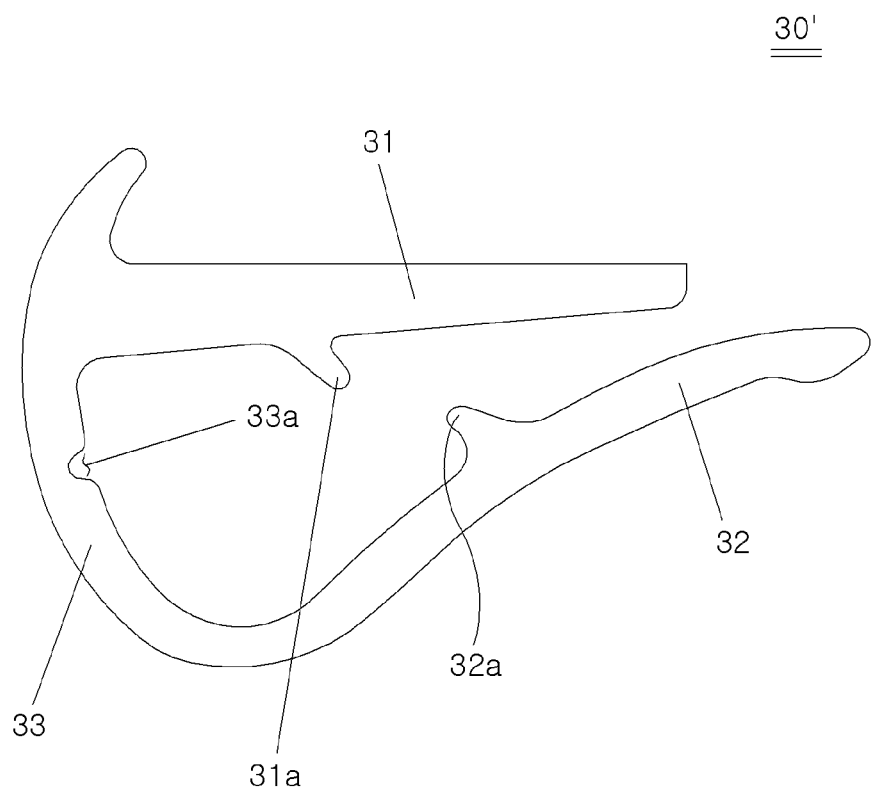
FIG. 8 is a cross-sectional diagram showing an internal glass run in the glass run of the door having improved the air-tightly sealing performance according to various exemplary embodiments of the present invention.

Meanwhile, FIG. 8 shows a glass run of a door having improved the air-tightly sealing performance according to various exemplary embodiments of the present invention.

A basic configuration in an exemplary embodiment of the present invention is the same as the glass run of the door having improved the air-tightly sealing performance in the above-described embodiment.

However, in an exemplary embodiment of the present invention, the direction of the locking protrusion 31a and the fastening protrusion 32a in an internal glass run 30' is formed to be opposite to that of the above-described embodiment. That is, in an exemplary embodiment of the present invention, the locking protrusion 31a is formed to be inclined from an imaginary horizontal axis toward the rear side of the vehicle, and the fastening protrusion 32a is formed to be inclined from the imaginary horizontal axis toward the front side of the vehicle.

The internal glass run 30' has the form in which the locking protrusion 31a and the fastening protrusion 32a are coupled with each other in the state fastened to the door likewise, such that the pillar portion 31 and the air-tightly sealing portion 32 are not slid at the open end side of the internal glass run 30'. Therefore, even if the water of high pressure and high flow rate is supplied, the air-tightly sealing portion 32 is not pushed, preventing water from being permeated into the door glass 20.

Furthermore, a constant space is formed in a portion adjacent to the connecting portion 33 inside the internal glass run 30', preventing the internal glass run 30' from being permanently deformed from the initial assembled state to a state where the sealing is degraded, and keeping the sealing performance as in the initial stage. The air-tightly sealing between the internal glass run 30' and the internal surface of the door glass 20 is kept, preventing water from being permeated into the internal surface of the door glass 20 even if the water from the outside thereof is permeated between the door glass 20 and the external glass run 40.

Figure 9:
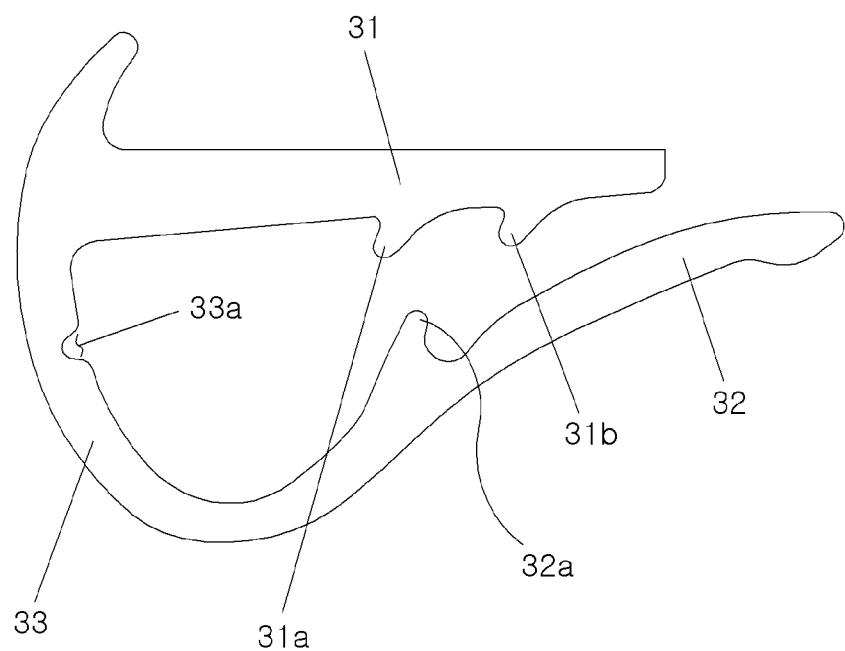
FIG. 9 is a cross-sectional diagram showing an internal glass run in the glass run of the door having improved the air-tightly sealing performance according to yet another exemplary embodiment of the present invention.

FIG. 9 shows a glass run of a door having improved the air-tightly sealing performance according to yet another exemplary embodiment of the present invention.

A basic configuration in an exemplary embodiment of the present invention is the same as the glass run of the door having improved the air-tightly sealing performance in the above-described embodiment.

In an exemplary embodiment of the present invention, the locking protrusions 31a, 31b formed on the pillar portion 31 are formed in plural in an internal glass run 30". The locking protrusions 31a, 31b are formed in plural on the pillar portion 31, forming the fastening structure more securely when the internal glass run 30" has been mounted on the door.

Of course, the fastening protrusion 32a can also be formed in plural even on the air-tightly sealing portion 32 in the internal glass run 30".

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A glass run of a door to have improved air-tightly sealing performance and to be mounted on a door frame for supporting a circumference of a door glass in the door of a vehicle, wherein the glass run comprises:
    an internal glass run to be mounted on the door frame to be in contact with an internal surface of the door glass; and
    an external glass run to be mounted on a portion of the door frame where a garnish is attached, and to support an end portion of the door glass, and
    wherein the internal glass run includes a support member for keeping a state in which the internal glass run has been initially mounted on the door,
    wherein the internal glass run includes a pillar portion to be attached to the door frame, and a sealing portion connected to the pillar portion to be in contact with the internal surface of the door glass,
    wherein the support member includes a locking protrusion to support the sealing portion, and a fastening protrusion to be fastened to the locking protrusion to support the pillar portion, and
    wherein when the door glass is closed, the door glass pushes the fastening protrusion to the locking protrusion so that the locking protrusion is locked by the fastening protrusion to form a closed area within the internal glass run, so that the pillar portion and the sealing portion do not move relative to each other, preventing the sealing portion from being spaced from the door glass by a washing water of high pressure.

2. The glass run of the door of claim 1,
    wherein the support member is formed on at least one of the pillar portion and the sealing portion.

3. The glass run of claim 2, wherein the locking protrusion is formed on the pillar portion and the fastening protrusion is formed on the sealing portion.

4. The glass run of claim 2,
    wherein the locking protrusion is protruded toward the sealing portion from the pillar portion,
    wherein the fastening protrusion is protruded toward the pillar portion from the sealing portion, and
    wherein the locking protrusion and the fastening protrusion are coupled to each other, when the door glass is closed.

5. The glass run of claim 4,
    wherein the locking protrusion and the fastening protrusion are formed to be inclined from an imaginary horizontal axis in a direction opposite to each other.

6. The glass run of claim 5,
    wherein the locking protrusion is formed to be inclined from the imaginary horizontal axis toward a front side of the vehicle, and the fastening protrusion is formed to be inclined from the imaginary horizontal axis toward a rear side of the vehicle.

7. The glass run of claim 5,
    wherein the locking protrusion is formed to be inclined from the imaginary horizontal axis toward a rear side of the vehicle, and the fastening protrusion is formed to be inclined from the imaginary horizontal axis toward a front side of the vehicle.

8. The glass run of claim 4,
    wherein the locking protrusion is formed in plural along an anteroposterior direction of the vehicle.

9. The glass run of claim 4,
    wherein a distal end portion of the sealing portion is formed longer than a distal end portion of the pillar portion in an anteroposterior direction of the vehicle.

10. The glass run of claim 2,
wherein the pillar portion and the sealing portion are connected to each other by a connecting portion, and
wherein the connecting portion includes a bending groove formed at a predetermined depth from an internal surface of the connecting portion.

11. An internal glass run comprising:
a pillar portion to be attached to a door frame; and
a sealing portion connected to the pillar portion to be in contact with an internal surface of a door glass, and
wherein a support member is formed on at least one of the pillar portion and the sealing portion,
wherein the support member includes a locking protrusion to support the sealing portion, and a fastening protrusion to be fastened to the locking protrusion to support the pillar portion, and
wherein when the door glass is closed, the door glass pushes the fastening protrusion to the locking protrusion so that the locking protrusion is locked by the fastening protrusion to form a closed area within the internal glass run, so that the pillar portion and the sealing portion do not move relative to each other, preventing the sealing portion from being spaced from the door glass by a washing water of high pressure.

12. The internal glass run of claim 11,
wherein the locking protrusion is protruded toward the sealing portion from the pillar portion,
wherein the fastening protrusion is protruded toward the pillar portion from the sealing portion, and
wherein the locking protrusion and the fastening protrusion are coupled to each other, when the door glass is closed.

13. The internal glass run of claim 12,
wherein the locking protrusion and the fastening protrusion are formed to be inclined from an imaginary horizontal axis in a direction opposite to each other.

14. The internal glass run of claim 13,
wherein the locking protrusion is formed to be inclined from the imaginary horizontal axis toward a front side of the vehicle, and the fastening protrusion is formed to be inclined from the imaginary horizontal axis toward a rear side of the vehicle.

15. The internal glass run of claim 13,
wherein the locking protrusion is formed to be inclined from the imaginary horizontal axis toward a rear side of the vehicle, and the fastening protrusion is formed to be inclined from the imaginary horizontal axis toward a front side of the vehicle.

16. The internal glass run of claim 12,
wherein the locking protrusion is formed in plural along an anteroposterior direction of the vehicle.

17. The internal glass run of claim 12,
wherein a distal end portion of the sealing portion is formed longer than a distal end portion of the pillar portion in an anteroposterior direction of the vehicle.

18. The internal glass run of claim 11,
wherein the pillar portion and the sealing portion are connected to each other by a connecting portion, and
wherein the connecting portion includes a bending groove formed at a predetermined depth from an internal surface of the connecting portion.

\* \* \* \* \*